Figure 1:
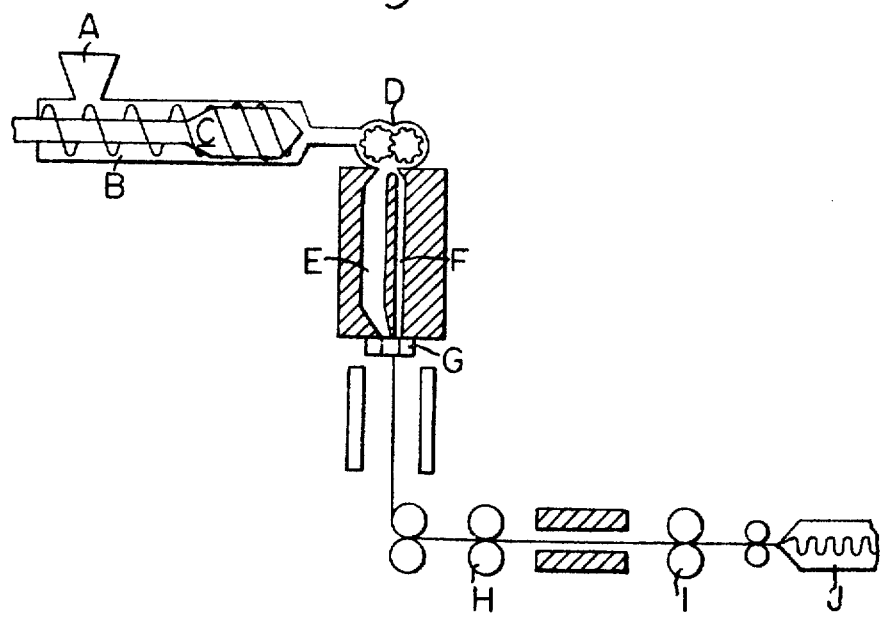

United States Patent [19]

Shimizu et al.

[11] 3,904,730
[45] Sept. 9, 1975

[54] PROCESS FOR THE PREPARATION OF POLYPROPYLENE CRIMPED FIBERS

[75] Inventors: Akira Shimizu, Iwakuni; Kyozi Ichihashi, Otake; Motoyasu Yusawa, Iwakuni, all of Japan

[73] Assignee: Mitsui Petrochemical Industrie Ltd., Tokyo, Japan

[22] Filed: Jan. 26, 1970

[21] Appl. No.: 5,583

[30] Foreign Application Priority Data
Jan. 28, 1969   Japan.................................. 44-5690

[52] U.S. Cl................. 264/171; 264/168; 264/211; 264/DIG. 26
[51] Int. Cl.²...................... B29F 3/10; B32B 31/30
[58] Field of Search.................... 264/171, 168, 211; 260/45.7 PS

[56] References Cited
UNITED STATES PATENTS

| | | | |
|---|---|---|---|
| 3,013,003 | 12/1961 | Maragliano et al. | 264/210 |
| 3,143,584 | 8/1964 | Roberts et al. | 264/210 |
| 3,179,621 | 4/1965 | Wright et al. | 260/45.7 PS |
| 3,244,667 | 4/1966 | Burgess | 260/45.7 PS |
| 3,261,804 | 7/1966 | Graham | 260/45.7 PS |
| 3,266,093 | 8/1966 | Corbett | 264/171 |
| 3,268,468 | 8/1966 | Barastoff et al. | 260/30.6 |
| 3,278,483 | 10/1966 | Wright et al. | 260/45.7 PS |
| 3,399,259 | 8/1968 | Brayford | 264/168 |
| 3,408,277 | 10/1968 | Martin et al. | 264/168 |
| 3,408,433 | 10/1968 | Brayford | 264/168 |
| 3,491,178 | 1/1970 | Nishicka et al. | 264/171 |
| 3,497,585 | 2/1970 | Chapman et al. | 264/171 |
| 3,509,013 | 4/1970 | Oppenlander | 161/173 |

FOREIGN PATENTS OR APPLICATIONS 1,087,823   10/1967   United Kingdom................ 264/171

*Primary Examiner*—Jay H. Woo
*Attorney, Agent, or Firm*—Sherman and Shalloway

[57] ABSTRACT

A process for the preparation of polypropylene crimped fibers which comprises blending with the starting polypropylene 0.05 to 5 percent by weight of thiophosphite or thiophosphate, melting the resulting polypropylene composition by heating, maintaining a certain portion of the molten flow of said polypropylene composition at the temperature and/or residence time conditions so suffficiently differing from those given to the remaining portion of the same flow as to develop crimps in the product composite yarns, spinning the molten flow as a whole into composite yarns, and drawing the spun composite yarns.

18 Claims, 8 Drawing Figures

PROCESS FOR THE PREPARATION OF POLYPROPYLENE CRIMPED FIBERS

This invention relates to a process for the preparation of polypropylene crimped fibers. More particularly, the invention relates to a process for the preparation of polypropylene composite fibers which exhibit excellent crimp properties from single starting material of polypropylene with which specific additive is blended.

Composite spinning is known as an effective method for obtaining crimped fibers. With composite spinning method, crimped fibers can be obtained without employing mechanical means. However, in order to produce high quality crimped fibers or yarns by a composite spinning method, it is necessary to alter the properties of the polymers to be composite-spun to adapt them to develop crimps in the resulting fibers. It has been known that excellent crimped fibers can be obtained by composite spinning of two polymers of different stereospecific properties, intrinsic viscosities [$\eta$], contents of polar groups, etc. That is, it is known that generally composite fibers of excellent crimping characteristics can be obtained from combination of two polymers of greatly differing properties.

However, one of the factors, which is by no means negligible at the stage of practical operability of composite spinning for obtaining crimped fibers, is the compatibility or adherability of the components. When the mutual adherability of components is poor, the composite-spun components are readily preled off from each other, i.e., the composite yarn is disintegrated into individual components. Generally speaking, when components of much differing properties are employed, the adherability of the components is deteriorated, and the resulting composite yarn can be separated into the individual components as aforesaid. Thus, in order to improve the mutual adhesive property of polymers, preferably homologs of polymers are selected.

In the field of composite melt spinning for making crimped yarns, use of same type of resins containing different blending agents, or the same resins and only one contains a blending agent, is known. However, practice of such means requires plural melt-extruders, and thus the method is subject to an industrial drawback that its operation is objectionably cumbersome.

Furthermore, there is reported an attempt of using only one polymer material, in which the molten resin flow of said polymer material is divided into two and given mutually differing residence time in the spinning machine to provide composite yarns imparted with crimping characteristics. In that attempt, however, the crimping ability of the composite yarns is not yet satisfactory. In order to improve the crimping ability to a satisfactory level, residence time of one of the resin flows must be drastically prolonged, which can be effected only with spinning machines of extremely complex structure.

The object of the subject invention, therefore, is to provide a process for the preparation of polypropylene composite yarns of excellent crimping characteristics, using single polypropylene as the starting material.

We discovered that, when at least one member of specific groups of thiophosphite and thiophosphate described in detail hereinbelow is blended with the starting polypropylene and melted, such properties as molecular weight, molecular weight distribution, stereospecific property, degree of crystallinity, birefringence, etc. of the polypropylene compositions are notably affected by the temperature of said melt as well as the melt's residence time in the passage. We further discovered that, when a certain portion of the flow of polypropylene melt, in which the specific thiophosphite or thiophosphate is blended, and the other portion of the same melt flow, are maintained at temperatures and/or residence time conditions mutually sufficiently differing to develop crimps in the composite yarns spun from the melt, composite polypropylene fibers having excellent crimping ability can be obtained.

Thus, according to the subject invention, a process for the preparation of polypropylene crimped fibers comprising melting starting polypropylene by heating, subjecting a certain portion of the molten polypropylene flow and other portion of same flow to different temperatures and/or residence time conditions, together spinning the molten flow into composite yarns, and stretching the spun yarns, is provided, which is characterized in that 0.05 to 5 percent by weight of at least one compound of the general formula

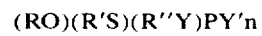

$$(RO)(R'S)(R''Y)PY'n \qquad (1)$$

in which
each of R, R' and R'' is selected from the group consisting of hydrogen and alkyl groups of at least 6 carbons, at least two of the R, R' and R'' being such alkyl groups,
each of Y and Y' is selected from the group consisting of oxygen and sulfur atoms, and
$n$ is 0 or 1 is blended with the starting polypropylene, and that the temperature and/or residence times given to two flow of melt are differed by the degree sufficient to develop crimps in the spun, composite yarns.

The starting polypropylene employed in the subject process can be any of known polypropylenes having stereospecific property conventionally employed for the preparation of polypropylene fibers. As the polypropylene resin, propylene copolymers containing up to 10 mol percent of other comonomers such as ethylene can be used as well as propylene homopolymers. Whereas, preferred polypropylenes for the present invention are those having intrinsic viscosities [$\eta$] in 135°C. decalin ranging from 0.5 to 3.0, and isotactic index, I.I., [residue from extraction with boiling n-heptane, percent] of at least 80.

According to the present invention, 0.05 to 5 percent by weight, preferably 0.07 to 3 percent by weight, of thiophosphite or thiophosphate of the formula

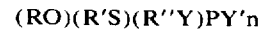

$$(RO)(R'S)(R''Y)PY'n \qquad (1)$$

is blended with the starting polypropylene.

Among the phosphorus compounds of the above formula (I), those in which all of R, R' and R'' are alkyl groups of at least 6 carbons, and those in which one of R, R' and R'' is hydrogen are preferred. As the alkyl groups, those of at least 6 carbons, preferably 6–24 carbons, such as lauryl, stearyl, octyl, 2-ethylhexyl groups, may be named.

The compounds of formula (I) used as the additive in the present invention are characterized by their structure that they have at least one alkyl group linked with phosphorus atom through an oxygen atom and also at least one alkyl group linked with the phosphorus atom through a sulfur atom. Such phosphite or phosphate compounds in which all the alkyl groups are linked with the phosphorus atom through oxygen fail to exhibit the crimp-promoting effect as shown by the compounds of formula (I) of this invention. Furthermore, such thiophosphite or thiophosphate compounds in which all the alkyl groups are linked with the phosphorus atom through sulfur exhibit generally reduced crimp-promoting effect compared with the phosphorus compounds within the scope of this invention.

Specific examples of the phosphorus compounds useful for the subject invention include the following, which are given only for the purpose of illustration:

(i) P(SR)(SR')(OR'')

in which R, R' and R'' are alkyl groups of at least 6 carbons, and R'' is hydrogen or an alkyl group of at least 6 carbons; for example,
Dithiodilauryl-monolauryl phosphite,
Dithiodilauryl-monostearyl phosphite,
Dithiodioctyl-monolauryl phosphite,
Dithiodilauryl-mono-2-ethylhexyl phosphite,
Dithiolaurylhydrogenphosphite,
Dithiodipalmityl-monoaralkyl phosphite, and
Dithiodiaralkyl-monopalmityl phosphite (ii) P(SR)(OR')(OR'')

in which R, R' and R'' are alkyl groups of at least 6 carbons; for example,
Thiolauryl-dilauryl phosphite,
Thiolauryl-di-2-ethylhexyl phosphite,
Thiooctyl-dilauryl phosphite,
Thiolauryl-monolaurylhydrogenphosphite,
Monothiocapryl-dipalmityl phosphite,
MOnothiopalmityl-dipalmityl phosphite, and
Monothioaralkyl-dipalmityl phosphite (iii) (S)O=P(SR)(SR')(OR'')

in which R, R' and R'' are alkyl groups of at least 6 carbons; for example,
Dithiodilauryl-monolauryl phosphate,
Dithiodilauryl-monostearyl phosphate,
Dithiodioctyl-monolauryl phosphate,
Dithiodilauryl-mono-2-ethylhexyl phosphate,
Dithiodilauryl-monolauryl thiophosphate,
Dithiopalmityl-monoaralkyl phosphate,
Dithiodiaralkyl-monopalmityl phosphate,
Dithiodicapryl-monoaralkyl thiophosphate,
Dithiodipalmityl-monopalmityl thiophosphate, and
Dithiodiaralkyl-monocapryl thiophosphate (iv) (S)O=P(SR)(OR')(OR'')

in which R, R' and R'' are alkyl groups of at least 6 carbons; for example,
Thiolauryl-dilauryl phosphate,
Thiolauryl-di-2-ethylhexyl phosphate,
Thiooctyl-dilauryl phosphate,
Thiolauryl-dioctyl phosphate,
Monothiopalmityl-diaralkyl phosphate,
Monothioaralkyl-dipalmityl phosphate,
Monothiocapryl-diaralkyl phosphate,
Monothiolauryl-dipalmityl thiophosphate,
Monothiopalmityl-dilauryl thiophosphate, and
Monothioaralkyl-dicapryl thiophosphate.

Those thiophosphites or thiophosphates can be used either singly or in combination. Also besides the foregoing, the phosphorus compounds can be used in the form of reaction product. That is, phosphorus trihalide can be reacted with 1–2 mols per mol thereof of an alkyl mercaptan in the presense of amine catalyst, further treated with the alcohol, and thereafter the product formed may be blended with the starting polypropylene.

The blending of those phosphites or phosphates with polypropylene resin can be effected by the means known per se. For example, the additive may be uniformly mixed into polypropylene preceding the melt extrusion, using, for example, Henschell mixer, Bumbury's mixer, blender, etc. Or, the blending of those thiophosphites or thiophosphates with polypropylene may be effected in the melt-extruder. In certain cases the thiophosphite may be partially converted to thiophosphate under the melting temperatures of polypropylene, but such is perfectly permissible, since the conversion is mainly to the phosphate within the scope of additives useful for the present invention.

It is generally recommendable to employ various compounding agents concurrently with the phosphorus compounds of formula (I) in the subject process. Useful stabilizers include phenolic stabilizers, thiocarboxylic acid alkyl ester stabilizers, ultraviolet ray absorbing agents, dyeing promotors, etc., which are preferably used in an amount not exceeding 1 percent by weight. It is also possible to blend pigment, in order to color the resulting yarns. In a preferred embodiment of the subject process, 0.05–0.5 percent by weight of metallic soap such as calcium stearate, zinc stearate, etc. or a known epoxy-type stabilizer, and 0.01–0.5 percent by weight of at least one of known stabilizers such as tetraquis[3,5-di-tert.-butyl-4-hydroxyhydrocinnamatemethyl]methane, 2,6-di-tert.-butyl-paracresol, dilaurylthio-dipropionate, etc. are blended with starting polypropylene.

According to the present invention, the polypropylene resin blended with afore-described phosphite or phosphate is melted by heating. The heating temperature is not critical, but generally those ranging from 190° to 330°C. are preferred. The melting of polypropylene composition can be effected in conventional screw-type extruder. The molten resin flow discharged from such screw-type extruder can be used as a single flow, or as two separate resin flows. When single flow system is used, one portion of the flow is maintained at a temperature and/or residence time condition sufficiently differing from those given to the remaining portion of same flow, as will develop crimps in the resulting composite yarns. Whereas, when the resin flow is divided into two, the temperatures and/or residence times of the two flows are differed by the degree sufficient to develop crimps in the resulting composite yarns.

In the present specification and claims, when one portion of single resin flow is given a temperature and/or residence time differing from those given to the rest of the same flow, the two portions are conveniently referred to as two flows, in order for clearer distinction.

Specific degree of difference between the temperatures and/or residence times to be employed is variable, depending on such factors as the type of phosphite or phosphate employed, and amount of the additive, etc. Generally speaking, in order to increase the difference in thermal shrinkage of the yarn components from two flows which is necessary to develop crimps in the product composite yarns, either the temperature difference between the two flows is made great, or the residence time ratio between the two flows is deviated from 1.

When the temperature difference between the two flows providing the two components of composite yarns exceeds 100°C., or the residence time ratio between the two flows exceeds 30, the property difference of the two resin flows becomes too excessive to produce satisfactory crimped fibers.

According to the preferred embodiments of the present invention, temperatures and residence times of the two molten resin flows are selected within the ranges defined by the empirical formulae below:

$$T_1 - T_2 \leq 100, \text{ preferably } -15 \leq T_1 - T_2 \leq 100,$$

$$t_1/t_2 \leq 30, \text{ preferably } 0.1 \leq t_1/t_2 \leq 30,$$

and $$\log t_1/t_2 \geq 0.01477(T_1 - T_2) + 0.0738$$

in which $T_1$ and $t_1$ stand respectively for the temperature (°C.) and residence time (min) of one of the resin flows, and $T_2$ and $t_2$ stand respectively for the temperature (°C.) and residence time (min.) of the other resin flow.

In accordance with the present invention, composite yarns of excellent crimping characteristics can be obtained from single polypropylene starting material, by thus adding the specific phosphite or phosphate to the starting polypropylene, and selecting the temperatures and residence times of the two flows of molten polypropylene blend within the specified ranges. It is particularly preferred to select the temperature difference, i.e., $T_1 - T_2$, ranging from 5° to 50°C., and the residence time ratio, $t_1/t_2$, within the range of 5–20.

According to the invention, the molten polypropylene composition is divided into two flows. The quantitative ratio of the flows may be selected from the range conventionally employed for known two-component composite yarns. Generally speaking, the quantitative ratio of the two flows may range 1 : 0.1 – 10 by weight, preferably 1 : 0.25 – 4, especially 1 : 1.

The two flows are then combined into an integrated flow and spun as composite yarn according to the invention. The structure of the composite yarns may be any of side-by-side relation of the two flows, or eccentric core-and-sheath relation thereof. In the melt spinning, structure and configuration and spinning pack and spinning nozzle are not particularly critical, but any of those conventionally employed in the melt spinning of crimped composite yarns, e.g., those described in U.S. Pat. No. 2,936,482, can be used. Preferred nozzle temperature in the melt spinning of composite yarns ranges from 200° to 330°C. When it is below 200°C., the spinning operation becomes difficult. Whereas, when the nozzle temperature exceeds 330°C., thermal decomposition of the polymer is objectionably advanced.

The integrated two molten resin flows is spun into, for example, cooling gaseous current of air, or of an inert gas such as nitrogen, solidified, and wound onto a bobbin. It that case, optionally a heating cylinder may be provided below the spinning nozzle to retard the solidification of the molten polymer flow.

The polypropylene composite yarns wound onto a bobbin is then stretched by the means known per se.

For example, the stretching can be effected by utilizing the difference in peripheral speeds of two pairs of rollers, with optional assistance of drawing pin or hot plate. It is also permissible to use wet or dry bath at the time of stretching. In the subject process, it is generally preferred to effect the stretching by the stretch ratio ranging from 2–10 times, particularly 3–7 times, at the temperatures ranging from 60°–150°C., particularly 90°–150°C. Instead of single stage stretching, multistage drawing may be effected by the means known per se.

It is likewise possible to subject the solidified, melt-spun composite yarns directly to the stretching procedure without intervening winding onto a bobbin, by the method known as "direct spinning," instead of effecting the spinning and stretching by two separate procedures.

Normally the stretching is performed sequentially to the melt spinning, but in certain cases it is preferred to allow the standing of melt-spun fibers for a day to a week, at the temperatures ranging from room temperature to 100°C. In this way the crimp development in the composite yarns after stretching can be improved.

The drawn, composite yarns of polypropylene obtained in accordance with the invention in certain cases exhibit crimps simply upon relaxing tension, but crimped yarns of excellent crimp stability are obtained by heat treating the drawn composite yarns in relaxed condition, at 90°–180°C. For the relaxed heat treatment, any atmosphere such as of heated air, steam, water, etc. may be employed.

Instead of subjecting the drawn composite yarns of polypropylene to such a relaxed heat treatment as it is, the yarns may be optionally first spun or knit with other types of yarns, and thereafter the resulting products may be given the relaxed heat treatment to develop crimps therein.

The subject process now will be explained with reference to the attached drawings.

Figure 2:
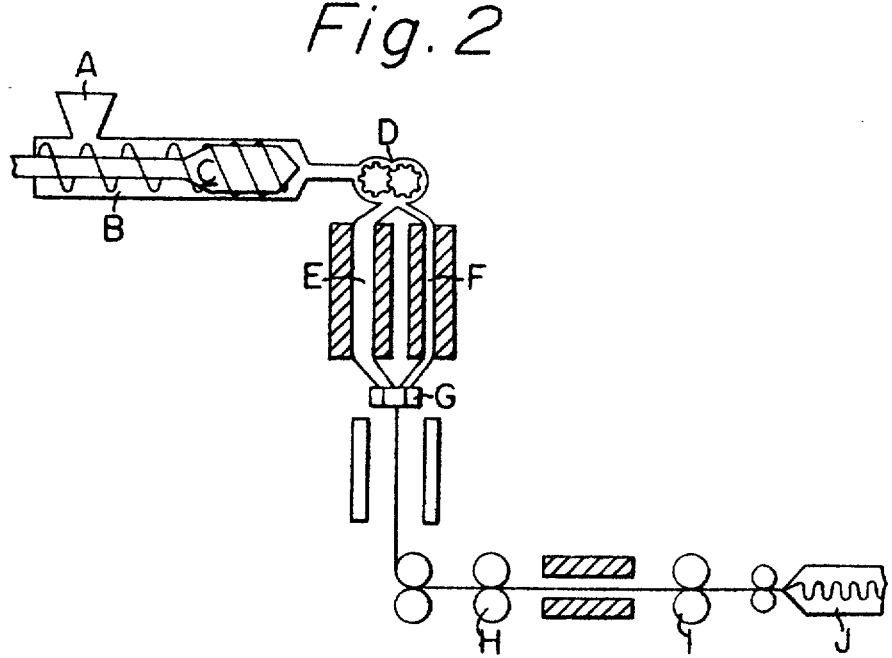
Figure 3:
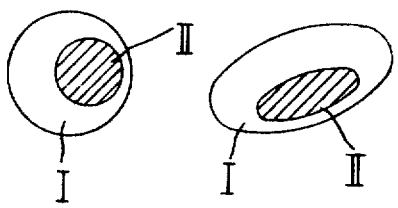
Figure 4:
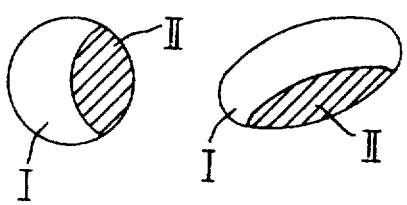
Figure 5:
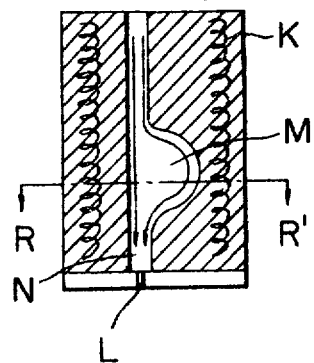
Figure 7:
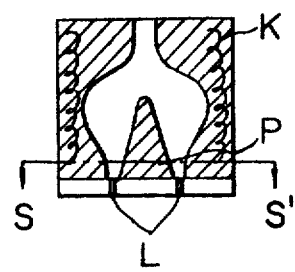
Figure 6:
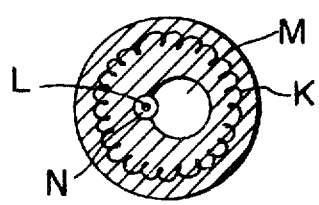
Figure 8:
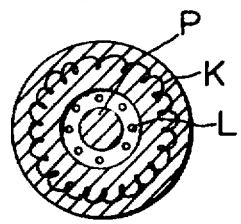

FIGS. 1 and 2 are the diagrams for explaining the arrangement of apparatuses for practicing the subject process;

FIGS. 3 and 4 show the cross sections of composite yarns composed of components I and II, which are produced in accordance with the subject process; and FIGS. 5 and 7 illustrate examples of path of single molten polymer flow employable in the present invention, FIG. 6 showing the cross-section of FIG. 5 cut along the line R—R', and FIG. 8 showing the cross-section of FIG. 7, cut along the line S—S'.

In FIGS. 5 through 8, K stands for a heater, and L denotes the spinning nozzle. Also in FIGS. 5 and 6, M is the resin reservoir, and N is the path of flow. In FIGS. 7 and 8, P stands for the torpedo. The temperature of the torpedo can be optionally set up using a heating medium or cooling medium not shown in the drawings.

One mode of practicing the subject process will be explained, referring to FIG. 1. Polypropylene blended with the additive specified in the invention is fed into an extruder B through hopper A, and melted therein as advanced to the gear pump D by means of screw C. The extruder is normally heated to 190° to 330°C., and the polymer is melted while travelling through the extruder, and fed into the gear pump at an elevated pressure. The gear pump D is provided for sending the molten polymer to the nozzle at a uniform rate. Although it is quite commonly used, its presence is not essential.

If the resistances at the flow passages E and F are unbalanced, plural gear pumps may be separately provided at the entrances of the passages E and F. Said passages E and F are provided within one block which is maintained at 200° to 330°C. This elevated temperature is provided with the heater (not shown), which may be contained in the block, or the heating may be effected externally. The heating medium may be steam. The passage E (which may be F) is given a greater length than those of the passage F, so that the residence time of the molten polypropylene blend therein should become longer than that in the passage F.

In this embodiment, the residence time ratio, i.e., residence time at passage E($t_1$)/residence time at passage F($t_2$) is maintained within the afore-specified range, and the temperatures at the two passages are not differed. The polypropylene flows passing through the two passages are combined at the composite spinning nozzle G, and spun. The structure of the composite spinning nozzle may be either that which will produce eccentric core-and-sheath relation composite yarns as illustrated in FIG. 3, or that which will produce the side-by-side relation composite yarns as illustrated in FIG. 4.

Thus spun composite yarns are solidified, and thereafter stretched between two pairs of rollers H and I, followed by a relaxed heat treatment given by the bath J to develop crimps.

Referring now to FIG. 2, the passages E and F of the polymer flow are provided in mutually independent blocks so that the residence times and temperatures of the two flows may be differed by optional degrees. In that case also the provision of one or two gear pumps, or omission thereof, is optional, similarly to the embodiment of FIG. 1. If the mutually independent passages E and F are designed to cause no difference in residence times of the two flows at said area, their temperatures are so selected to provide sufficient temperature difference, within the afore-specified range. Also if a single polymer flow system is employed, a passage of the flow of the configuration as illustrated in FIG. 5 or 7 may be provided between D and G, instead of the passages E and F shown in FIG. 1 or 2.

According to the process of this invention, polypropylene composite yarns of excellent crimping properties can be obtained by blending the specified phosphite or phosphate with the starting polypropylene, without extremely increasing the temperature difference and/or residence time difference of the two molten polymer flows in the spinning machine. In fact, when composite yarns are spun under identical conditions employed in the subject process, without blending the specified phosphite or phosphate with the starting polypropylene, the products fail to exhibit the crimping characteristics as shown by the composite yarns prepared in accordance with the present invention.

The crimped composite yarns of polypropylene thus produced by the subject process are useful for various clothing usages.

EXAMPLE 1

A polypropylene melt having an [η] of 2.4 and an isotactic index of 96, which contained 0.2 wt. percent of tetraquis [3,5-di-tert.-butyl-4-hydroxyhydrocinnamatemethyl] methane, 0.3 wt. percent of 2,6-di-tert.-butyl-paracresol, 0.1 wt. percent of calcium stearate and 0.4 wt. percent of dithiodilauryl-monolauryl phosphite, was divided into two flows of substantially the same flow amount, and passed through the two passages E and F illustrated in FIG. 1. Both passages E and F were maintained at 270°C., and the respective residence times of the melt at the passages were 15 minutes and 1 minute. The two flows were subsequently combined and melt-spun through the composite spinning nozzle G illustrated in FIG. 1, which was 1 mm in diameter, 4 mm in length, and maintained at 280°C., and wound onto a bobbin at a rate of 300 m/min. This as-spun composibe yarn was stretched by 6 times in a dry heat bath of 135°C., followed by 1 minute's heat treatment at 135°C. free of tension. The obtained crimped fibers had the properties as follows:

| | |
|---|---|
| Number of crimps | 87/25 cm |
| Strength | 5.15 g/d |
| Elongation | 48.5 % |
| Crimp modulus of elasticity | 94 %. |

EXAMPLE 2

A polypropylene having an [η] of 2.1 and an isotactic index of 97, which contained 0.2 wt. percent of tetraquis [3,5-di-tert.-butyl-4-hydroxyhydrocinnamatemethyl]methane, 0.2 wt. percent of calcium stearate, and 0.2 wt. percent of dithiodilauryl-monostearyl phosphite, was melt-spun in the manner described in Example 1. The as-spun yarn was stretched by 5 times in a dry heat bath of 140°C., followed by one minute's heat treatment at 130°C. free of tension. The obtained crimped fibers had the properties as follows:

| | |
|---|---|
| Number of crimps | 84/25 cm |
| Strength | 5.99 g/d |
| Elongation | 54.5 % |
| Crimp modulus of elasticity | 94 %. |

EXAMPLE 3

The polypropylene composition of Example 1 in which dithiodilauryl-monolauryl phosphite was replaced by the same amount of dithio-dilauryl-monohexyl phosphite was melt-extruded, and divided into two flows at the ratio of 8 : 2 by weight to be passed through the passages E and F properties: illustrated in FIG. 2. The temperatures of the passages E and F were, respectively, 290°C. and 250°C., and the residence times of the melt therein were, respectively, 1 minute and 2 minutes. Then the two flows were together melt-spun through a composite spinning nozzle G illustrated in FIG. 2, which was 1 mm in diameter, 4 mm in length, and maintained at 270°C. The so-spun composite yarn was wound onto a bobbin at a rate of 300 m/min., and stored in a thermostat of 30°C for 24 hours, followed by a stretching by 5 times in a dry heat bath of 135°C., and 30 seconds' heat treatment at 135°C. free of tension. The obtained crimped fibers had the following properties:

| | |
|---|---|
| Number of crimps | 78/25 cm |
| Strength | 4.80 g/d |
| Elongation | 45.1 % |
| Crimp modulus of elasticity | 95 % |

EXAMPLE 4

A polypropylene having an [$\eta$] of 1.8 and an isotactic index of 97, which contained 0.2 wt. percent of 2,6-di-tert.-butyl-paracresol and 0.5 wt. percent of monothiomonolauryl-dilauryl phosphite, was melt-extruded, and divided into two flows at a ratio of 1 : 1 by weight, to be passed through the passages E and F illustrated in FIG. 2. The temperatures of the passages E and F were, respectively, 240°C. and 270°C., residence times of the melt therein were both 1 minute. Then the two flows were together melt-spun through the composite spinning nozzle G shown in FIG. 2, which was 1 mm in diameter, 4 mm in length, and maintained at 260°C. Thus obtained as-spun composite yarn was wound onto a bobbin at a rate of 350 m/min., and subsequently stretched and heat-treated free of tension similarly to Example 3. The resulting crimped fibers had the properties as follows:

| | |
|---|---|
| Number of crimps | 79/25 cm |
| Strength | 6.23 g/d |
| Elongation | 42.8 % |
| Crimp modulus of elasticity | 93 %. |

EXAMPLE 5

A polypropylene having an [$\eta$] of 2.8 and an isotactic index of 89, which contained 0.5 wt. percent of tetraquis [3,5-di-tert.butyl-4-hydroxyhydrocinnamatemethyl]methane, 0.2 wt. percent of thiodipropionic acid dilauryl ester, 0.1 wt. percent of calcium stearate, and 0.1 wt. percent of dithiodilauryl-hydrogenphosphite, was melt-spun, stretched and heat-treated free of tension in the manner of Example 3. The obtained crimped fibers had the following properties:

| | |
|---|---|
| Number of crimps | 95/25 cm |
| Strength | 4.57 g/d |
| Elongation | 55.6 % |
| Crimp modulus of elasticity | 90 %. |

EXAMPLE 6

A polypropylene having an [$\eta$] of 1.8 and an isotactic index of 97, which contained 0.2 wt. percent of 2,6-di-tert.-butyl-paracresol and 0.5 wt. percent of monothiolauryl-dilauryl phosphite, was melt-extruded, divided into two flows at a ratio of 1 : 1 by weight, and passed through the passages E and F illustrated in FIG. 2. The temperatures of the passages E and F were, respectively, 300°C. and 240°C., and the residence times of the melt therein were, respectively, 1 minute and 1.2 minutes. Then the two flows were together melt-spun through a composite spinning nozzle G illustrated in FIG. 2, which was 1 mm in diameter, 4 mm in length, and maintained at 300°C., and wound onto a bobbin at a rate of 350 m/min.

This as-spun composite yarn was stretched and heat-treated free of tension similarly to Example 3. The resulting crimped fibers had the properties as follows:

| | |
|---|---|
| Number of crimps | 85/25 cm |
| Strength | 6.23 g/d |
| Elongation | 42.8 % |
| Crimp modulus of elasticity | 93 % |

EXAMPLE 7

A polypropylene having an [$\eta$] of 2,4 and an isotactic index of 96, which contained 0.2 wt. percent of tetraquis [3,5-di-tert.-butyl-4-hydroxyhydrocinnamatemethyl]methane, 0.2 wt. percent of calcium stearate, and 0.4 wt. percent of dithiodilauryl-monolauryl phosphate, was melt-extruded, divided into two flows of substantially same flow amount, and passed through the passages E and F illustrated in FIG. 2. The temperatures of the passages were, respectively, 260°C. and 265°C., and the residence times of the melt therein were, respectively, 15 minutes and 1 minute. Then the two flows were together melt-spun into a composite yarn, stretched, and heat-treated free of tension similarly to Example 3. The obtained crimped fibers had the properties as follows:

| | |
|---|---|
| Number of crimps | 80/25 cm |
| Strength | 5.16 g/d |
| Elongation | 45.5 % |
| Crimp modulus of elasticity | 93 %. |

EXAMPLE 8

A polypropylene having an [$\eta$] of 1.3 and an isotactic index of 97, which contained 0.2 wt. percent of 2,6-di-tert.-butyl-paracresol, 0.1 wt. percent of zinc stearate, and 2.0 wt. percent of monothiomonolauryl-dilauryl phosphate, was melt-extruded, divided into two flows of substantially equal flow amcunt, and passed through the passages E and F illustrated in FIG. 2. The temperatures of the passages E and F were, respectively, 250°C. and 220°C., and the residence times of the melt therein were, respectively, 6 minutes and 1 minute. Then the two flows were together melt-spun into a composite yarn, stretched, and heat-treated free of tension similarly to Example 3. The obtained crimped fibers had the following properties.

| | |
|---|---|
| Number of crimps | 86/25 cm |
| Strength | 6.12 g/d |
| Elongation | 46.3 % |
| Crimp modulus of elasticity | 94 % |

EXAMPLE 9

A polypropylene having an [$\eta$] of 2.4 and an isotactic index of 96, which contained 0.2 wt. percent of 2,6-di-tert.butyl-paracresol, 0.1 wt. percent of calcium stearate, 0.2 wt. percent of dithiodilauryl-monolauryl phosphite, and 0.2 wt. percent of dithiodilauryl-monolauryl phosphate, was melt-extruded, divided into two flows of substantially equal flow amount, and passed through the passages E and F shown in FIG. 2. The temperatures of the passages E and F were, respectively, 290°C. and 250°C., and residence times of the melt therein were both 1 minute. Then the two flows were together melt-spun into a composite yarn, drawn, and heat-treated free of tension similarly to Example 3. Thus obtained crimped fibers had the following properties:

| Number of crimps | 95/25 cm |
| --- | --- |
| Strength | 4.84 g/d |
| Elongation | 52.1 % |
| Crimped modulus of elasticity | 94 %. |

EXAMPLE 10

An ethylene-propylene copolymer (ethylene content = 4 mol percent) having an [η] of 3.0 and an isotactic index of 85, which contained 0.2 wt. percent of tetraquis [3,5-di-tert.-butyl-4-hydroxyhydrocinnamatemethyl]methane, 0.2 wt. percent of calcium stearate, and 0.4 wt. percent of dithiodilauryl-monolauryl phosphite, was melt-extruded, divided into two flows of substantially equal flow amount, and passed through the passages E and F shown in FIG. 2. The temperatures at the passages E and F were, respectively, 270°C. and 240°C., and residence times of the melt therein were, respectively, 1.5 minutes and 1 minute. Then the two flows were together melt-spun into a composite yarn, stretched, and heat-treated free of tension similarly to Example 3. The obtained crimped fibers had the properties as follows:

| Number of crimps | 82/25 cm |
| --- | --- |
| Strength | 4.12 g/d |
| Elongation | 59.6 % |
| Crimp modulus of elasticity | 89 % |

EXAMPLE 11

A four-necked flask of 500 cc in capacity equipped with a stirrer, reflux condenser and thermometer, of which inside atmosphere had been nitrogen-substituted, was charged with 100 cc of heptane, and into which 0.2 mol of phosphorus trichloride was added and dissolved. To the solution then 0.4 mol of laurylmercaptan was added through a dropping funnel under stirring, and thereafter 100 cc of a heptane solution containing 0.4 mol of triethylamine was slowly added through a dropping funnel under violent stirring. As the reaction advanced, the temperature within the flask rose to 45°C. Stirring was further continued for approximately 30 minutes. When the reaction completed and the temperature started to fall, the flask was heated externally to maintain its inside temperature at 45°C., and stirring was continued for an additional hour. Thereafter 0.2 mol of lauryl alcohol was added into the flask, followed by an hour's stirring. The inside temperature of the flask was raised to 80°C., and the system was further stirred for 30 minutes. After the reaction was terminated, the reaction product was cooled, and from which triethylamine hydrochloride was filtered off, and heptane was distilled off. To the remaining reaction product, large quantities of acetone which was cooled to −10° to +5°C. was added to cause precipitation. The precipitate was separated by filtration and washed several times with cold acetone to be removed to unreacted mercaptan and alcohol. Upon drying the then filtered precipitate, 75 g of an odorless crystalline product was recovered.

A polypropylene having an [η] of 2.4 and an isotactic index of 96, which contained 0.4 wt. percent of the above crystalline product, 0.2 wt. percent of 2,6-di-tert.-butyl-paracresol, and 0.2 wt. percent of calcium stearate, was melt-extruded, divided into two flows of substantially equal flow amount, and passed through the passages E and F shown in FIG. 2. The temperatures of the passages E and F were, respectively, 290°C. and 250°C., and residence times of the melt therein were, respectively, 1.5 minutes and 1 minute. Then the two flows were together melt-spun into a composite yarn, stretched and heat-treated free of tension similarly to Example 3. The obtained crimped fibers had the following properties:

| Number of crimps | 92/25 cm |
| --- | --- |
| Strength | 5.21 g/d |
| Elongation | 52.3 % |
| Crimp modulus of elasticity | 94 % |

EXAMPLE 12

The polypropylene composition of Example 1 was melt-extruded, and the melt was passed through the passage (270°C.) provided with the resin reservoir M as shown in FIG. 5 as a single flow. In that case, the average residence time of the molten resin flow passing through the side of said resin reservoir M was 2 minutes, and that of the molten resin flow not passing through the resin reservoir M was 1 minute. The two flows together passed through the passage N, and melt-spun at a rate of 300 m/min. through an ordinary nozzle L shown in FIG. 5. Then the resulting undrawn yarn was immediately drawn by 5 times in an air bath of 130°C. without first winding onto a bobbin, followed by 1 minute's heat treatment at 135°C. free of tension. The obtained crimped fibers had the properties as follows:

| Number of crimps | 87/25 cm |
| --- | --- |
| Strength | 5.17 g/d |
| Elongation | 50.6 % |
| Crimped modulus of elasticity | 91 % |

EXAMPLE 13

The polypropylene composition of Example 1 was melt-extruded, and passed through the passage provided with a torpedo P shown in FIGS. 7 and 8, without being divided into two separate passages. The peripheral part of the passage was heated to 310°C., and the torpedo P was maintained at approximately 250°C. by the temperature of the melt. Thus the melt had a temperature gradient in the direction perpendicular to that of the flow. The residence time of the melt passing in the vicinity of torpedo P was 1 minute, and that of the melt flowing through the portion apart from torpedo P wsa 1.2 minutes.

The melt was spun through the ordinary nozzle L shown in FIGS. 7 and 8 at a rate of 300 m/min. Thus obtained yarn was stretched by 5 times in a dry heat bath of 135°C., followed by 1 minute's heat treatment at 140°C. free of tension. The obtained crimped fibers had the following properties:

| Number of crimps | 89/25 gm |
| --- | --- |
| Strength | 4.92 g/d |
| Elongation | 52.1 % |
| Crimp modulus of elasticity | 93 % |

CONTROL 1

A polypropylene melt having an $[\eta]$ of 2.4 and an isotactic index of 96, which contained 0.2 wt. percent of tetraquis [3,5-di-tert.-butyl-4-hydroxyhydrocinnamatemethyl]methane, 0.3 wt. percent of 2,6-di-tert.-butyl-paracresol, and 0.1 wt. percent of calcium stearate, was divided into two flows of substantially equal flow amount, and passed through the passages E and F as shown in FIG. 2. The temperatures of the passages E and F were, respectively, 290°C. and 250°C., and the residence times of the melt therein were both 1 minute. Then the two flows were together melt-spun through a composite spinning nozzle G (temperature: 280°C.) shown in FIG. 2, which was 1 mm in diameter and 4 mm in length, and wound onto a bobbin at a rate of 300 m/min. This composite yarn was stretched by 6 times in a dry heat bath of 135°C., followed by 1 minute's heat treatment at 135°C. free of tension. The obtained crimped fibers had the properties as follows:

| | |
|---|---|
| Number of crimps | 21/25 cm |
| Strength | 5.15 g/d |
| Elongation | 44.3 % |
| Crimp modulus of elasticity | 72 % |

As demonstrated in the above, the crimp density of the product was as low as 21 per 25 cm, which by no means is satisfactory.

CONTROL 2

A polypropylene melt having an $[\eta]$ of 2.4 and an isotactic index of 96, which contained 0.2 wt. percent of tetraquis[3,5-di-tert.-butyl-4-hydrohydrocinnamatemethyl]methane, 0.3 wt. percent of 2,6-di-tert.-butyl-paracresol, 0.1 wt. percent of trilauryl phosphite, was treated in accordance with Control 1. The obtained crimped fibers had the properties as follows:

| | |
|---|---|
| Number of crimps | 32/25 cm |
| Strength | 5.54 g/d |
| Elongation | 52.3 % |
| Crimp modulus of elasticity | 76 % |

The product had objectionably low crimp density, and unsatisfactory for practical use.

CONTROL 3

A polypropylene melt having an $[\eta]$ of 2.4 and an isotactic index of 96, which contained 0.2 wt. percent of tetraquis[3,5-di-tert.-butyl-4-hydroxyhydrocinnamatemethyl]methane, 0.3 wt. percent of 2,6-di-tert.-butyl-paracresol, 0.1 wt. percent of calcium stearate, and 0.2 wt. percent of trithiotrilauryl phosphite, was treated in accordance with Control 1. The resulting crimped fibers had the following properties:

| | |
|---|---|
| Number of crimps | 64/25 cm |
| Strength | 4.80 g/d |
| Elongation | 44.1 % |
| Crimp modulus of elasticity | 92 % |

The product showed still unsatisfactorily low crimp density.

CONTROL 4

A polypropylene melt having an $[\eta]$ of 2.4 and an isotactic index of 96, which contained 0.2 wt. percent of tetraquis[3,5-di-tert.-butyl-4-hydroxyhydrocinnamatemethyl]methane, 0.3 wt. percent of 2,6-di-tert.-butyl-paracresol, 0.1 wt. percent of calcium stearate, and 0.4 wt. percent of dithiodilauryl-monophenyl phosphite, was treated in accordance with Control 1. The resulting crimped fibers had the properties as follows:

| | |
|---|---|
| Number of crimps | 60/25 cm |
| Strength | 5.34 g/d |
| Elongation | 53.9 % |
| Crimp modulus of elasticity | 82 % |

The product thus had a crimp density of 60/25 cm, which is too low for a satisfactory crimped fibers.

We claim:

1. In a process for the preparation of polypropylene crimped fibers by a process which comprises melting a starting polypropylene by heating, dividing the molten polypropylene into two flows, combining said two flows, spinning the combined flow into composite filaments and drawing said composite filaments, the improvement which comprises blending with the starting polypropylene 0.05 to 5 percent by weight of at least one phosphorus compound of the formula $$(RO)(R'S)(R''Y)PY'_n$$

wherein R, R' and R'' represent a group selected from hydrogen and alkyl groups of at least 6 carbon atoms, at least two of R, R' and R'' being such alkyl groups; Y and Y' each represent oxygen or sulfur; and $n$ is 0 or 1, melting the polypropylene containing said phosphorus compound at a temperature of 190° to 330°C., and maintaining the temperatures a residence times of said two flows within the ranges defined by the formulae:

$$200 \leq T_1, T_2 \leq 330,$$

$$t_1 - T_2 \leq 100$$

$$t_1/t_2 \leq 30 \text{ and}$$

$$\log t_1/t_2 \geq -0.01477 (T_1 - T_2) + 0.738$$

wherein $T_1$ and $t_1$ represent respectively the temperature (°C.) and residence time (minutes) of one of the resin flows, and $T_2$ and $t_2$ represent respectively the temperature (°C.) and residence time (minutes) of one of the sesin flows, and the $T_2$ and $t_2$ represent respectively the temperature (°C.) and residence time (minutes) of the other resin flow.

2. The process of claim 1, wherein the starting molten resin flow is discharged from an extruder as a single flow, and a certain portion of said flow and the remaining portion thereof are subjected to such residence time conditions mutually differing by the degree sufficient to develop crimps in the final composite fibers.

3. The process of claim 1, wherein the starting molten resin flow is discharged from an extruder divided into two separate flows, said separate flows being subjected to such temperature and residence time conditions mutually differing by the degree sufficient to develop crimps in the final composite fibers.

4. The process of claim 1, wherein the starting molten resin flow is discharged from an extruder divided into two separate flows, said separate flows being subjected to such temperature conditions mutually differing by the degree sufficient to develop crimps in the final composite fibers.

5. The process of claim 1, wherein the starting molten resin flow is discharged from an extruder divided into two separate flows, said separate flows being subjected to such residence time conditions mutually differing by the degree sufficient to develop crimps in the final composite fibers.

6. The process of claim 1, wherein the temperatures and residence times of said two flows are respectively maintained with the ranges defined by the formulae below:

$$200 \leq T_1, T_2 \leq 330,$$

$$-15 \leq T_1 - T_2 \leq 100,$$

$$0.3 \leq t_1/t_2 \leq 30 \text{ and}$$

$$\log t_1/t_2 \geq -0.01477(T_1 - T_2) + 0.0738$$

wherein $T_1$ and $t_1$ represent respectively the temperature (°C.) and residence time (minutes) of one of the resin flows and $T_2$ and $t_2$ represent respectively the temperature (°C.) and residence time (minutes) of the other resin flow.

7. The process of claim 1, wherein the starting molten resin flow is discharged from an extruder as a single flow and a certain portion of said flow and the remaining portion thereof are subjected to such temperature and residence time conditions mutually differing by the degree sufficient to develop crimps in the final composite fibers.

8. The process of claim 1, wherein the starting molten resin flow is discharged from an extruder divided into two separate flows, said separate flows being subjected to such temperature and residence time conditions mutually differing by a degree sufficient to develop crimps in the final composite fibers.

9. The process of claim 1, wherein said starting polypropylene has an intrinsic viscosity, [η], as measured in 135°C. decalin, of from 0.5 to 3.0, and an isotactic index, I.I., of at least 80.

10. The process of claim 1, wherein said phosphorus compound is dithiodialkyl-monoalkyl phosphite.

11. The process of claim 1, wherein said phosphorus compound is thioalkyl-dialkyl phosphite.

12. The process of claim 1, wherein said phosphorus compound is dithioalkyl-monoalkyl phosphate.

13. The process of claim 1, wherein said phosphorus compound is thioalkyl-dialkyl phosphate.

14. The process of claim 1, wherein said phosphorus compound is a mixture of phosphite and phosphate.

15. The process of claim 1, wherein said phosphorus compound is the product obtained through the reaction of phosphorus triahalide with an alkyl mercaptan, and the reaction of the resulting reaction product with an alcohol.

16. The process of claim 1, wherein the melt-spun composite filaments are drawn by 2 to 10 times their original length.

17. The process of claim 16, wherein the drawn composite filaments are further heat-treated in a relaxed state at temperatures of from 90°–180°C.

18. In a process for the preparation of polypropylene crimped fibers by process which comprises melting a starting polypropylene by heating, dividing the molten polypropylene into two flows, combining said two flows, spinning the combined flow into composite filaments and drawing said composite filaments, the improvement which comprises belending with the starting polypropylene having an intrinsic viscosity [η], as measured in 135°C. decalin, of from 0.5 to 3.0 and an isotactic index, I.I., of at least 80, 0.05 to 5 percent by weight of at least one phosphorus compound selected from the group consisting of (1) dithiodialkyl-monoalkyl phosphites, (2) thioalkyl-dialkylphosphites, (3) dithioalkyl-monoalkyl phosphates and (4) thioalkyldialkyl phosphates, in which each of the alkyl groups has at least 6 carbon atoms; melting the polypropylene containing said phorphorus cocmpound at 190°–330°C., while maintaining said two flows, respectively at temperatures ranging from 200° to 300°C. and residence times sufficient to develop crimps in said composite fibers, said temperatures and residence times of said two flows being respectively maintained within the ranges defined by the formulae:

$$-15 \leq T_1 - T_2 \leq 100$$

$$0.1 \; t_1/t_2 \leq 30 \text{ and}$$

$$\log t_1/t_2 \geq -0.01477(t_1 - T_2) + 0.0738$$

wherein $T_1$ and $t_1$ represent respectively the temperature (°C.) and residence time (minutes) of one of the resin flows and $T_2$ and $t_2$ represent respectively the temperature (°C.) and residence time (minutes) of the other resin flow.

* * * * *

UNITED STATES PATENT OFFICE
CERTIFICATE OF CORRECTION

Patent No. 3,904,730  Dated September 9, 1975

Inventor(s) AKIRA SHIMIZU ET AL

It is certified that error appears in the above-identified patent and that said Letters Patent are hereby corrected as shown below:

In the claims:

Column 15, claim 6, line 18, delete "0.3" and insert --0.1--

Signed and Sealed this sixteenth Day of December 1975

[SEAL]

Attest:

RUTH C. MASON
Attesting Officer

C. MARSHALL DANN
Commissioner of Patents and Trademarks